UNITED STATES PATENT OFFICE.

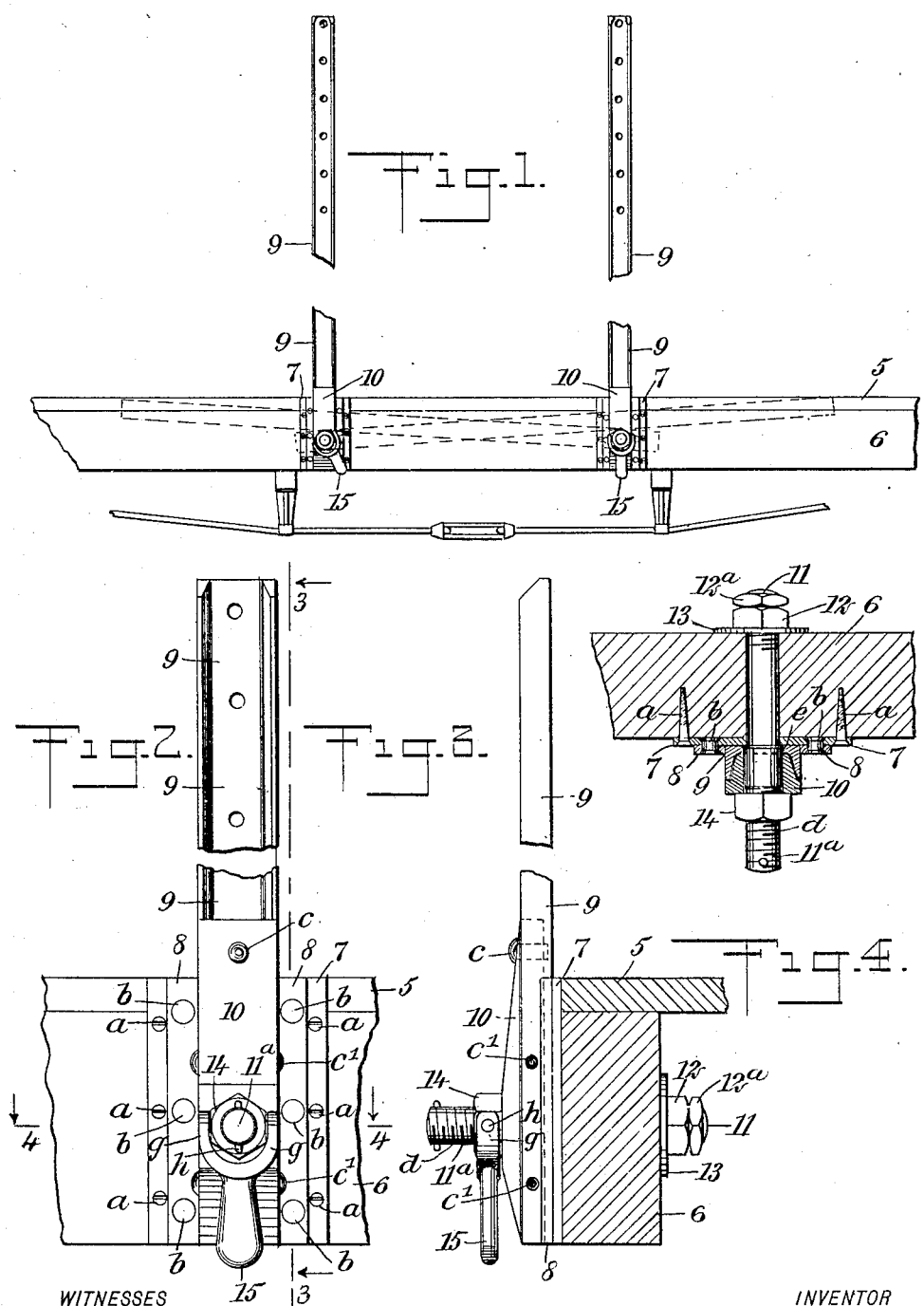

FRED W. LAWRENCE, OF BONNER, MONTANA, ASSIGNOR OF ONE-HALF TO GEORGE H. CLYNICK, OF BONNER, MONTANA.

CAR-STAKE.

No. 878,405.  Specification of Letters Patent.  Patented Feb. 4, 1908.

Application filed October 4, 1907. Serial No. 395,888.

To all whom it may concern:

Be it known that I, FRED W. LAWRENCE, a citizen of the United States, and a resident of Bonner, in the county of Missoula and State of Montana, have invented a new and Improved Car-Stake, of which the following is a full, clear, and exact description.

This invention relates to stakes for gondola or other flat platform cars, used for carrying timber, scantling, boards or other freight that is piled upon the car floor, above the low side boards thereon; and has for its object to provide novel details of construction for a car stake, which render it light, strong, convenient to apply and remove, and also that will enable the quick folding of the stakes on the side of a car, for affording access to material on the car that is to be unloaded.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a side view in part of a platform car body and of two of the improved stakes mounted thereon; Fig. 2 is an enlarged front side view of the improved stake, broken away between ends of the body portion, and mounted at the lower end upon the side of a platform car body; Fig. 3 is a vertical transverse sectional view, substantially on the line 3—3 in Fig. 2, and Fig. 4 is a sectional plan view, substantially on the line 4—4 in Fig. 2.

In the drawings, 5 represents the floor of a platform car and 6 a side timber or sill whereon the floor is secured.

In service a plurality of car stakes are provided for each side of a car, which are spaced apart thereon; two of the improved car stakes being shown in Fig. 1, each one comprising the following details: A sill plate 7, rectangular edgewise and of proper area, is securable upon the sill 6 by screw bolts $a$, and upon said plate two flat bars 8 are secured by rivets $b$, said bars or ledge strips being spaced apart in parallel vertical planes, thus affording a shallow recess between them. The stake 9 of a suitable length is formed of channel iron, having a width that adapts the lower end portion thereof, to fit loosely between the opposed side edges of the ledge strips 8, when the stake is seated in the recess between said ledge strips. In the stake 9 and sill plate 7 at their transverse centers and a proper distance from lower transverse edges thereof, a circular hole of a suitable diameter is formed that is opposite a similar hole in the body of the sill 6. In the channel that is formed in the outer surface of the stake 9, a washer plate 10 is fitted, and in service is secured in place by a bolt $c$ that is affixed in the upper portion of the washer plate and in the body of the stake, as shown in Figs. 2 and 3. The washer plate is further secured in place by transverse rivets $c'$ that pass through the plate and also through the side flanges on the stake whereon they are riveted. The washer plate 10 is likewise perforated in alinement with the registering holes in the stake sill plate and car sill, but preferably the perforation in the washer plate is slightly increased in diameter.

A pivot bolt 11 is neatly fitted near one end thereof in the bored hole formed in the washer plate 10, and thence projects out through said washer plate, having a screw thread $d$ formed on said projecting end portion $11^a$, as shown in Fig. 3 and 4. The body of the bolt 11 is reduced from a point $e$, forming an annular shoulder thereon, that seats upon the circular edge of the hole formed to receive said bolt in the sill plate 7, which projects through the sill 6, fitting neatly in the perforation therein. A portion of the bolt 11 that is extended through the sill 6 and projects from its inner side is threaded, and upon said threaded end two nuts 12, $12^a$ are mounted a washer 13, being first placed upon the bolt and bearing upon the side of the sill. The nut 12 is first screwed up, so as to draw the shoulder $e$ on the pivot bolt 11 into firm engagement with the sill plate 7, and then the nut $12^a$ is forced against the nut 12, so as to prevent it from unscrewing. Upon the threaded end portion $11^a$ of the pivot bolt 11, a nut 14 is mounted, and upon the nut is pivoted the forked jaws of a crotched lever 15, that affords convenient means for turning the nut so as to bind the washer plate 10 upon the stake 9 or loosen it. A cross pin $h$ or the like is placed in a perforation of the pivot bolt near the extremity of the threaded portion 11ª, for preventing the removal of the nut 14 therefrom.

In use, the stake 9 is placed upright in the recess between the ledges 8, and then clamped against the sill plate 7 by a proper adjustment of the nut 14, and, as before mentioned, a plurality of such stakes are thus erected along each side of a platform car body, for retaining a piled up load of lumber or the like on the car. To facilitate the removal of the load from the car, the stakes at one side thereof from which the load is to be taken are folded, as shown by dotted lines in Fig. 1, this being permitted if the nuts 14 are slackened by manipulation of the levers 15, and if the stakes are to be retained in folded adjustment for a time the nuts 14 may be screwed up so as to bind the washer plates 10 and folded stakes upon the ledges 8, on each sill plate 7. In the stakes 9 a plurality of spaced perforations $i$ are formed for the reception of binding wires or ropes, used for holding a high load on a car from shifting while in transit.

Having described my invention, I claim as new and desire to secure by Letters Patent:

1. A car stake, comprising a channeled metal body, a recessed sill plate wherein the stake may be seated, a washer plate contacting with the channeled face of the stake, a transverse pivot bolt, and nuts on the bolt that by adjustment clamp the washer plate on the stake or release it.

2. A car stake, comprising a channeled metal body, a recessed sill plate wherein the stake may be seated, a shouldered pivot bolt threaded at each end, jam nuts on one end of said bolt, a washer plate contacting with the channeled face of the stake and perforated for the reception of the pivot bolt, and a nut on said bolt bearing upon the washer plate.

3. A car stake, comprising a channeled metal body, a recessed sill plate wherein the stake may be seated, a shouldered pivot bolt threaded on each end and passing through perforations in the stake and sill plate, the shoulder on the bolt seating on the edge of the perforation in the sill plate, jam nuts on one end of the pivot bolt, a perforated washer plate through which the pivot bolt passes, a nut screwing on the bolt and bearing upon the washer plate, and a crotched lever pivoted at its fork upon said nut.

In testimony whereof I have signed my name to this specification in the presence of two subscribing witnesses.

FRED W. LAWRENCE.

Witnesses:
H. M. BROOKS,
JOHN L. WILEY.